July 8, 1924.
F. W. GRAF
1,500,189
PISTON RING COMPRESSOR
Filed June 22, 1923
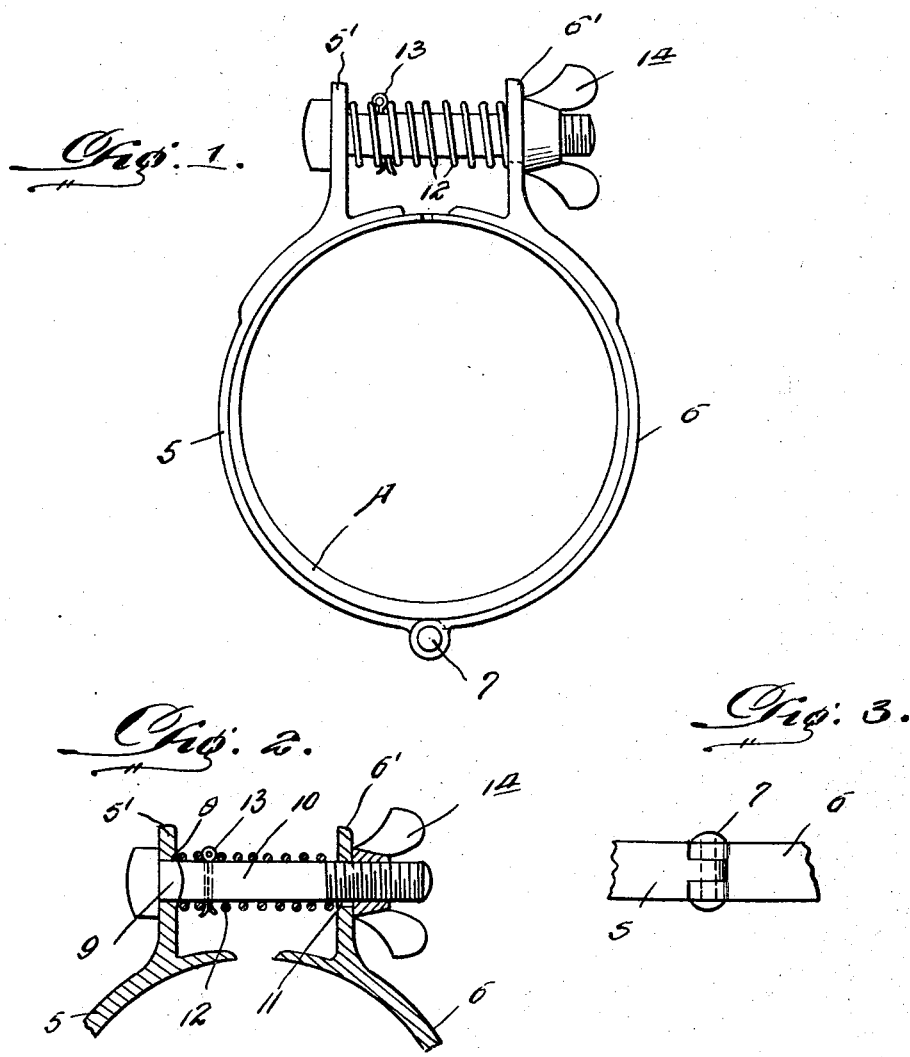

Patented July 8, 1924.

1,500,189

UNITED STATES PATENT OFFICE.

FREDERICK W. GRAF, OF HOUSTON, TEXAS.

PISTON-RING COMPRESSOR.

Application filed June 22, 1923. Serial No. 647,134.

*To all whom it may concern:*

Be it known that I, FREDERICK W. GRAF, a citizen of the United States, residing at Houston, in the county of Harris and State of Texas, have invented certain new and useful Improvements in Piston-Ring Compressors, of which the following is a specification.

In carrying out the present invention it is my purpose to provide a highly simplified form of tool whereby the usual expansible rings of pistons may be compressed upon said pistons for enabling the same to be properly positioned within their respective cylinders.

The primary object of my invention resides in the provision of such compressor for piston rings that is extremely simple of construction and one that may be manufactured and marketed at a small cost, the invention being further characterized by its ease of operation and effectiveness of purpose.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:—

Figure 1 is a top plan view of my compressor in operation.

Figure 2 is a fragmentary detail cross-section of my compressor for more clearly disclosing the means whereby the half sections of the implement may be brought together during the compressing of a ring, and Figure 3 is a fragmentary elevation disclosing more clearly the hinge connection between the sections comprised in my device.

With particular reference to the drawing, my novel tool comprises a pair of semi-circular ring sections 5 and 6 hingedly joined together at one end as at 7. These ring sections 5 and 6 are formed of a suitable non-flexible metal and are of a width preferably slightly greater than the width of the piston rings to be compressed.

Each of the sections 5 and 6 is formed adjacent its free end with a laterally extending finger 5' and 6', respectively, of a desirable length and of a ratio with respect to said ring sections as shown in Figure 1.

The finger 5' is formed adjacent its end with a square shaped opening 8 for the reception of the usual square portion 9 of a headed and threaded bolt 10. In alinement with the opening 8 in said finger 5' the finger 6' is provided with a circular opening 11 and is of a size to permit free movement of said bolt 10 therethrough.

Surrounding the bolt 10 between fingers 5' and 6' is a helical expansion spring 12 and in engagement within a transverse opening of said bolt 10 adjacent the headed end thereof is a cotter pin 13, this cotter pin extending through one of the convolutes of said spring 12 and affording a means for preventing disengagement of said spring from the bolt as well as the removal of the same from the finger 5'.

Adapted for threaded engagement with the threaded end of the bolt 10 upon the outer side of the finger 6' is a wing nut 14 and in view of the foregoing it will be obvious that when my compressor is positioned around a piston ring A a turning up of said wing nut 14 will effectively compress said ring.

In actual practice when it is dsired to replace a piston within its cylinder from the crank case of the engine my novel tool is positioned around the piston ring at a point adjacent the lower edge thereof and so manipulated as to compress the ring to a position flush with the wall of the piston for allowing the same to be moved upwardly within the cylinder a slight distance after which the two may be removed.

Numerous advantages of a tool of this character will be apparent to those skilled in the art and even though I have herein set fully the most practical embodiment of the invention with which I am now at present familiar, I desire to have it understood that minor changes may be made therein without departing from the spirit and scope of the appended claims.

Having described my invention, what I claim and desire to secure by Letters-Patent, is:—

1. A piston ring compressor comprising a pair of semi-circular half sections hingedly joined together at one end, said sections being provided at their free end portions and spaced from the end edges thereof with outstanding fingers, a traction bolt passing transversely through the fingers and bridging the space between them and the end edges of the sections, and a spring mounted upon the bolt and bearing at its ends against the inner faces of the fingers.

2. A piston ring compressor comprising a pair of semi-circular half sections hingedly joined together at one end, said sections being provided at their free end portions and at points spaced from the end edges thereof with outstanding fingers, a traction bolt passing transversely through the fingers and bridging the space between them and the space between the end edges of the sections, a coil spring mounted upon the bolt and bearing at its ends against the inner faces of the fingers, and a pin passing transversely through the bolt and having end portions located between the adjacent convolutions of the spring, there being a greater number of the convolutions of the spring located at one side of the pin than at the opposite side thereof.

In testimony whereof I affix my signature.

FREDERICK W. GRAF.